INVENTORS J. S. COURTNEY-PRATT
L. E. HARGROVE

BY Charles E. Graves

ATTORNEY 3,435,230

OPTICAL INFORMATION TRANSMISSION SYSTEM

Jeofry S. Courtney-Pratt, Springfield, and Logan E. Hargrove, Berkeley Heights, N.J., assignors to Bell Telephone Laboratories, Incorporated, Murray Hill, N.J., a corporation of New York Filed Dec. 8, 1966, Ser. No. 600,150
Int. Cl. H01s *3/10;* H04b *9/00*
U.S. Cl. 250—199 8 Claims

ABSTRACT OF THE DISCLOSURE

The frequency spectrum (Fourier components) of a train of suitable optical pulses having a more or less constant repetition rate can be shifted substantially up or down without affecting the repetition rate. The amount of shift can be made to depend linearly upon an information-bearing signal. This invention teaches the upshifting of odd pulses and the downshifting of even pulses, and their transmission in different time slots to a detecting site. There, a suitable path length difference is inserted so that adjacent upshifted and downshifted pulses coincide in time and space to produce a beat frequency from which the desired information is extracted.

This invention relates to optical information transmission systems.

As is well known, one of the most promising applications of the optical maser or laser lies in the field of information transmission. Its potential suitability for this purpose traces to the extremely high propagation frequencies and frequency bandwidth of optical energy.

Given the laser as a source of coherent light, the task of transmitting information therewith basically involves modulating the light in response to some information-bearing signal, transmitting the modulated light energy to a receiving point, and there demodulating the light energy to extract the desired information.

Most optical information transmission schemes thus far proposed, however, suffer from one or more drawbacks relating to complexity of equipment, reliability of transmission and bit capacity of the system.

It is accordingly a general obect of this invention to devise a high capacity, reliable optical information transmission system.

The present invention makes use of the fact that the frequency spectrum (Fourier components) of a train of suitable optical pulses having a more or less constant repetition rate can be shifted without affecting the repetition rate. The amount of shift can be made to depend linearly upon an information bearing input signal. In accordance with the invention, alternate optical pulses of such a train are shifted in frequency upwards and downwards, and the successive upshifted and downshifted pulses are transmitted in different time slots to a detecting site. There, an appropriate path-length difference is inserted so that adjacent upshifted and downshifted pulses coincide in time and space to produce a beat frequency. This beat frequency for an individual pair of such pulses is essentially twice the amount of the frequency shift of one of the component pulses from its unmodulated position. From this varying beat frequency the information input signal is extracted.

In accordance with one embodiment of the invention, the optical pulse train source is the output of a mode-locked laser of the type shown and described in the copending United States patent application Ser. No. 362,319 of L. E. Hargrove, filed Apr. 24, 1964, and assigned to applicant's assignee. As disclosed therein, this device is a gas maser oscillator in which both the frequency and the amplitude of the so-called longitudinal modes have been stabilized. As thus coupled or locked together, these modes exhibit a highly defined amplitude and phase characteristic. When so locked, the maser output consists of a train of optical pulses which for a set pulse repetition rate exhibit a fixed frequency spectrum centered about a characteristic frequency. The center frequency's nominal value is $nc/2L$, where $n$ is an integer, $c$ is the velocity of light and L is the effective length of the maser cavity resonator for the mode at the center of the Doppler-broadened gain curve. The stabilized output of this maser is well suited as a pulse train source for the present invention.

One method for effecting the desired shift in frequency spectrum of the optical pulses is disclosed, for example, in the copending United States application Ser. No. 586,153 of M. A. Duguay, filed Oct. 12, 1966, and assigned to applicants' assignee. As disclosed therein, a shift in the frequency of a light beam passing through a crystal of electro-optic material occurs when the material is subjected to a suitably changing electric field. In the present invention, the incident beam is a train of pulses from, for example, the aforementioned mode-locked gas maser of Hargrove, characterized by a stable frequency spectrum and a steady pulse repetition rate.

As will be described in more detail below, the magnitude of the varying electric potential applied, for example, to the electro-optic crystal of Duguay represents in the present invention the information to be transmitted. If the varying potential is a sinusoid for example, there then is a region occurring once per cycle during which the refractive index of the crystal is increasing approximately linearly, and another region occurring once per cycle during which the refractive index is decreasing approximately linearly. The refraction index-modulating signal and the maser output are phased so that each two successive light pulses pass through the crystal respectively at these times in the cycle. The extent of the frequency shift of a given pulse depends upon the magnitude and direction of the time rate of change of the potential applied to the crystal. Put another way, the extent of the shift is linearly dependent on the peak amplitude of the sinusoidally varying potential applied to the crystal. The pulse train thus now consists of a series of alternately upshifted and downshifted pulses, each differing in its frequency spectrum from the pulse received in the crystal modulator by some desired amount.

The optical pulse train so modulated is transmitted to a detection site where, pursuant to a prime facet of the present invention, an appropriate path length difference is inserted to effect a space-time coincidence of each pair of adjacent upshifted and downshifted pulses. In the preferred embodiment, this beating together of adjacent pulses in a pulse train comprising pulses $n$, $n+1$, $n+2$, etc., involves first beating pulse $n$ with pulse $n+1$; next beating pulse $n+1$ with pulse $n+2$, and so on. The resulting modulation product is a beat frequency which is approximately twice the amount of frequency shift undergone by either of the parent pulses. Each successive pulse pair exhibits a beat frequency in accordance with the coding scheme used at the crystal modulator. An ordinary photoelectric cell or, more specifically, a photomultiplier with a photoemissive cathode will act both as a detector and demodulator giving a signal the frequency of which is an analog of the information bearing electric potential applied to the crystal.

The advantages of the described optical information transmission system are several fold. Since energy is being transmitted as optical pulses rather than as a continuous optical wave, it is possible by using a pulse locked detector to reduce the noise in proportion approximately to the square root of the ratio of the pulse interval to the pulse length. This can easily amount to a factor of five or more. The system is also relatively insensitive to amplitude variations or scintillation in the transmission path. Further, it is not necessary to maintain any synchronization of basic frequencies between the maser transmitter and the receiver as is necessary in ordinary heterodyne systems.

Accordingly, it is a feature of the invention that an optical pulse train of substantially fixed frequency spectrum and pulse repetition rate is passed through a frequency shifting medium excited by an applied information signal so that alternate optical pulses are upshifted and downshifted from the fixed frequency by amounts proportional to the applied signal.

It is a further feature of the invention that each adjacent upshifted and downshifted optical pulse is, on receipt by a detector, suitably combined in time and space to produce a beat frequency from which the original information signal may be extracted.

These and other objects and advantages, the nature of the present invention, and its various features, will appear more fully upon consideration of the illustrative embodiment now to be described in detail in conjunction with the accompanying drawing, in which.

Figure 1:
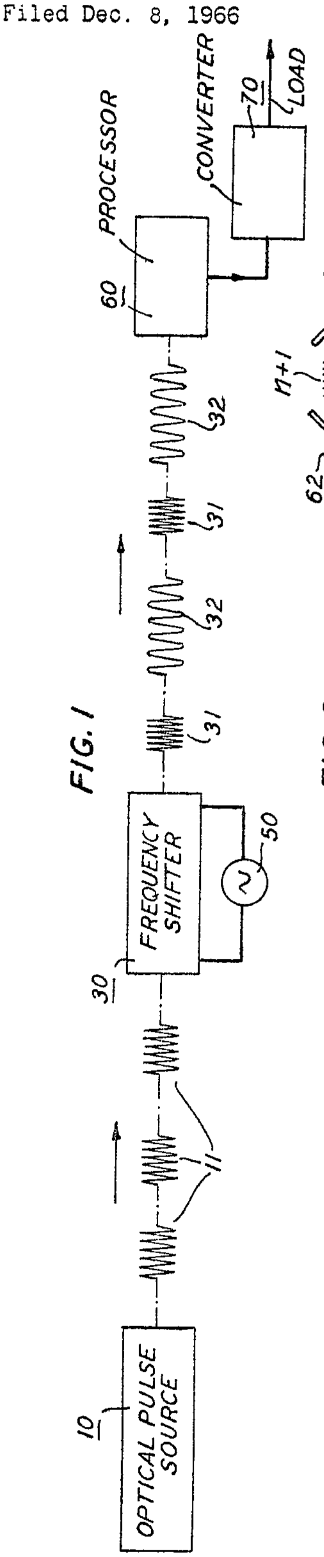
FIG. 1 is a schematic block diagram of the overall system.

The invention is illustrated broadly in the functional block diagram of FIG. 1. An optical pulse train generator 10 produces a beam of optical pulses 11 in which the frequency spectrum is fixed and the repetition rate is set. The pulse train is directed through an optical frequency-shifting arrangement 30 which in response to a varying information-bearing input signal 50 upshifts the frequency spectrum of the odd numbered pulses 31, and downshifts the frequency spectrum of the even-numbered pulses 32 by amounts proportional to the input signal. The repetition rate of pulses 11 has not been changed. The upshifted and downshifted pulses are transmitted in different time slots to a detecting site where part of the energy of each successive pulse is delayed in a processor 60 to allow part of the following pulse to catch up in time and space. The output of processor 60 is a series of electrical pulses the frequency spectrum of which centers about a beat frequency resulting from the space-time coincidence of adjacent pulse pairs and the repetition rate of which is again equal to that of the original pulse train. The beat frequency varies by twice the amount of the frequency shift of one of its member pulses from the unmodulated position. A converter 70 extracts from this time-varying beat frequency the desired information contained in input signal 50.

Figure 2:
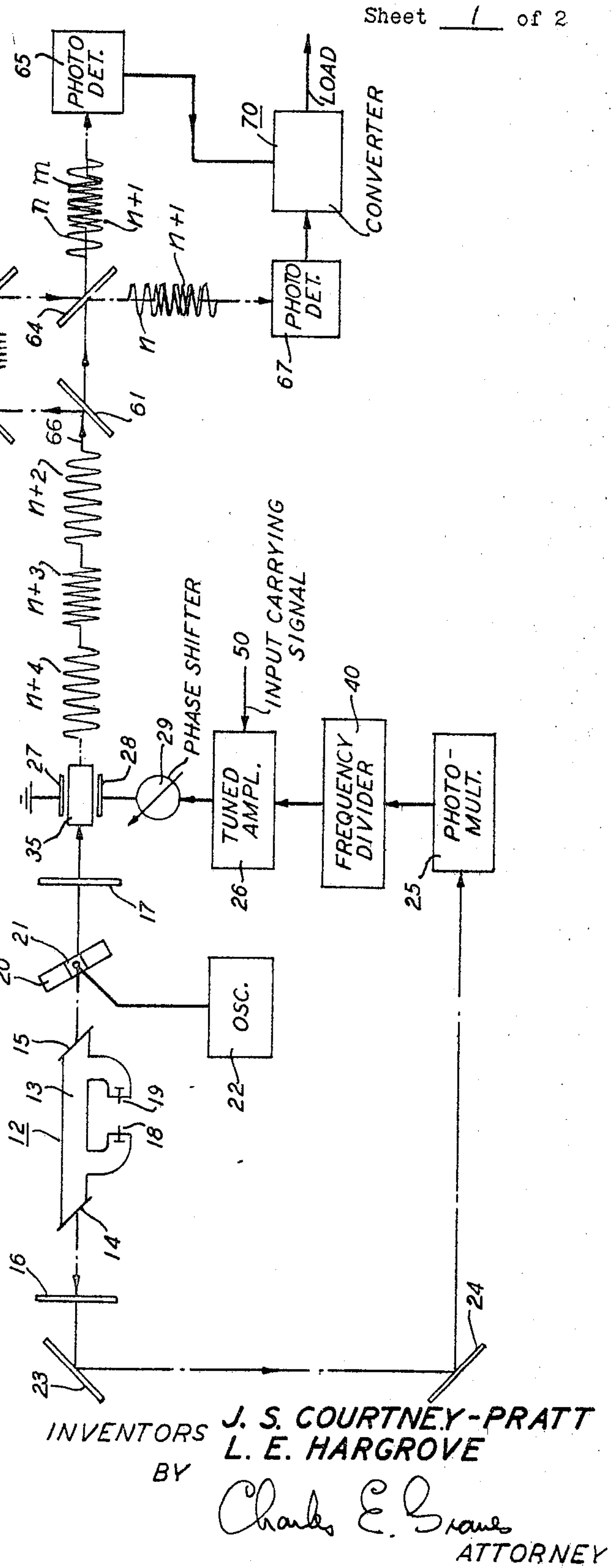
FIG. 2 is a schematic diagram of an illustrative embodiment thereof.

FIG. 2 illustrates one suitable optical pulse train generator, the mode-locked gaseous maser disclosed in the noted patent application of Hargrove. As taught therein, the maser 12 comprises an elongated tube 13 containing an active gaseous medium and including transparent end portions 14, 15 inclined at the Brewster angle. Tube 13 is positioned within an optical cavity defined by partially transmissive mirrors 16, 17. The gas is suitably excited by means, for example, of electrodes 18, 19 which produce an electrical discharge in the gas with an applied D-C voltage. A modulator 20, for example, a fused quartz block, is stationed within the cavity in the light path between end 15 and mirror 17. A transducer 21 mounted on modulator 20 and connected to an oscillator 22 induces ultrasonic standing waves therein. Modulator block 20 is homogeneous twice each period and hence the light wave generated between mirrors 16, 17 is perturbed at a rate twice that of the modulator frequency.

Figure 3:
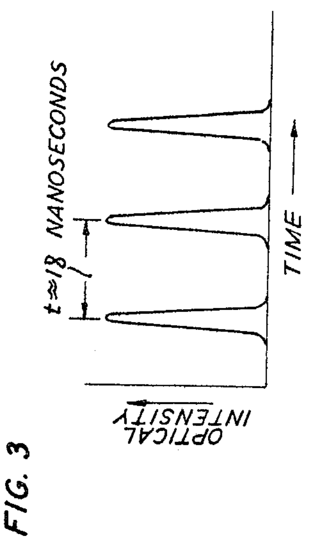
FIGS. 3, 4 and 5 are graphs showing various frequency, phase and other relationships occurring in the system.
Figure 4:
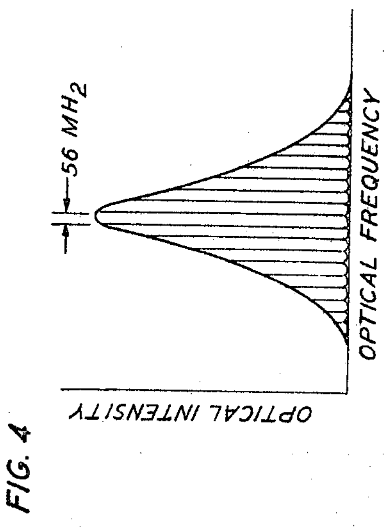

As explained in detail in the noted Hargrove application, the perturbation center frequency is nominally $nc/2L$, $n$ being an integer and L being the effective length of the cavity for the axial mode at the center of the Doppler-broadened gain curve. The effect is to stabilize, or couple, all modes together with a well-defined amplitude and phase. The maser output consists of a series of pulses depicted on a time scale in FIG. 3 whose repetition rate equals twice the perturbation frequency—typically 56 mHz.—and whose frequency spectrum consists of a plurality of components (each connoting a separate axial mode) uniformly spaced 56 mHz. apart as shown in FIG. 4.

The maser output is directed, for example, first through mirror 17 into a medium 35 exhibiting an electro-optic effect, i.e., its refractive index changes in an applied electric field. Such an arrangement is taught in the mentioned patent application of Duguay. As noted therein, a satisfactory material for medium 35 is a lithium metaniobate ($LiNbO_3$) crystal; and the pulse train may be passed through it several times for enhanced frequency shifts.

An electrical signal that is phase-coherent with the optical pulses is required which, advantageously, can be derived as a second output from maser 12. This is achieved, for example, by directing an output through mirror 16 and reflectors 23, 24 to a photomultiplier 25 which produces a 56 mHz. electrical output. In turn, this output is fed through frequency divider 40 which for reasons apparent below reduces the frequency to 28 mHz. The signal from frequency divider 40 is fed to amplifier 26. The amplification therein effected is made to vary in accordance with an information-bearing signal 50. Amplifier 26 is adapted to produce an amplitude-modulated sinusoid.

This sinusoid is applied through a phase shifter 29 to crystal 35 by means, for example, of plates 27, 28 and in the proper phase relationship with respect to the incoming optical pulses. Hence, the electric field applied to crystal 35 is such that it produces a rate of change in the crystal's refractive index, and this rate of change varies in accordance with signal 50. The optical pulses are present in the crystal during the intervals when the greatest time rate of change of refractive index is occurring.

If, as taught in the mentioned patent application of Duguay, the medium is a slab-shaped single domain crystal of lithium metaniobate properly placed in the varying electric field, the change in refractive index for light polarized along its major axis is given by $$\Delta n = -n_{e}^{3} r_{33} \frac{E}{2} = -1.64 \times 10^{-8} E$$

wherein $n_e$ is the extraordinary index (equal to about 2.20 at $\lambda=0.633$ micron), $r_{33}$ is the appropriate electro-optic coefficient (equal to $3.08 \times 10^{-9}$ cm./volt) and the electric field E is expressed in volts/cm. In practice, a shift amounting to about 850 mHz. is thus obtained for one traversal of the crystal. As an optical pulse takes about 0.2 nanosecond to traverse the crystal while the time during which the field E is changing almost linearly is substantially greater, it is possible by increasing the number of crystal traversals to achieve frequency shifts of the order of 2.5 gHz.

Figure 5:
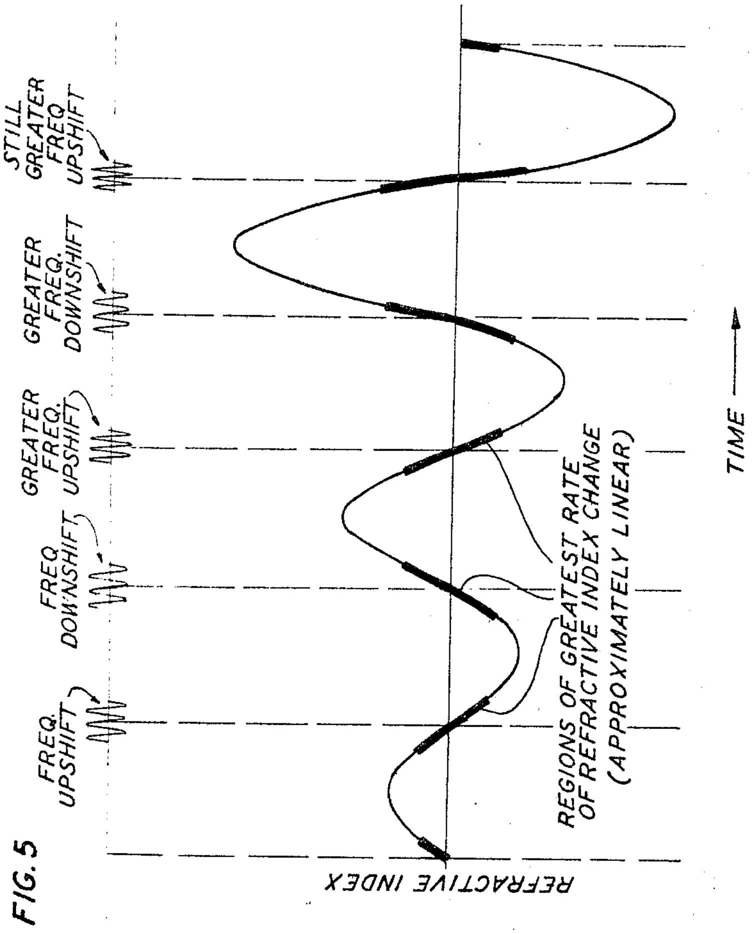

If the basic repetition rate of the pulses incident upon crystal 35 is X pulses per second and the output of amplifier 26 is at a frequency of $X/2$ cycles per second, then given proper phasing it is seen that each odd pulse will pass through crystal 35 at a time of increasing refractive index and each even pulse will pass through crystals 35 at a time of decreasing refractive index. As illustrated in FIG. 5, if the strength of the electric field applied to crystal 35 varies sinusoidally at $X/2$ cycles per second but with a magnitude governed by information signal 50, then each odd pulse confronts an increasing refractive index and each even pulse confronts a decreasing refractive index. The rate of increase and decrease varies from pulse to pulse. The result is that the pulses undergo a desired sequence of varying frequency spectrum upshifts and downshifts.

The pulses so modulated are transmitted by appropriate means to a time delay optical processor 60 at a detecting site. As shown in FIG. 2 processor 60 comprises reflectors 61, 62, 63, 64. Reflectors 61 and 64 are partially transmitting, partially reflecting (typically semi-transparent); reflectors 62 and 63 are of high reflectivity. The optical path 61–62–63–64 is arranged to be longer than the optical path 61–64 by exactly the distance light can travel in the $1/X$ and X as before is the pulse repetition rate. An incoming beam 66 consisting of alternate up- and downshifted pulses $n$, $n+1$, $n+2$, $n+3$, etc., is incident on reflector 61. Each such pulse is transformed by reflector 61 into two pulses of approximately equal energy, one following path 61–64 and the other path 61–62–63–64. Consider a point $m$ beyond reflector 64 and in the path of beam 66. A pulse at point $m$ is the $n+1$ pulse if the path it followed was 61–64; but it is the $n$ pulse if the path it followed was 61–62–63–64.

Owing to the chosen optical path lengths, pulses $n$ and $n+1$ now are superimposed and shortly fall together on photodetector 65. The latter thus will contain in its output the beat frequency corresponding to the difference in optical frequency between pulses $n$ and $n+1$. The next pulse pair received by processor 60 comprises $n+1$ and $n+2$. In the same manner just described, these two pulses are superimposed and photodetector 65 now will contain in its output the beat frequency corresponding to the difference in optical frequency between pulse $n+1$ and $n+2$.

As reflector 64 is semitransmitting, only half the energy of the incoming pulses falls ultimately on photodetector 65. The remaining energy may, however, be captured by a second photodetector 67 stationed as seen in FIG. 2 in the other output path of reflector 64. By operating photodetectors 65, 67 in parallel, the energy otherwise lost is collected and used. Additionally, at the receiver end, it may be desirable to amplify the received optical pulses before beating them.

The beat frequency output of processor 60 may vary from zero for the no-change condition to 5 gHz. or more. An optical maser may typically have a frequency stability of 1 mHz. per millisecond, i.e., a short term stability of a few cycles per second over a time interval equal to the time between successive pulses. From this point of view, therefore, the information-handling capacity of the system is of the order of $10^9$ bits/sec.—although the sampling rate which is equal to the pulse repetition rate may reduce this by a factor of 10 or perhaps 100.

The beat frequency output of photodetectors 65, 66 can be smoothed by the use of any conventional filtering circuits (not shown) to suppress the pulse repetition frequency. The smooth output of the filters can be used directly or processed in any of the ways customarily used to process convention FM signals.

Other pulse sources are, of course, suitable. For example, one might employ a stabilized optical maser that does not have an intracavity modulator but which has some external modulator to produce the pulses. One also might consider the use of electromagnetic radiation in the wavelength ranges adjacent to the visible spectrum (infrared or ultraviolet radiation), and even in the microwave and radio range. The lower frequencies would only allow smaller bandwidth operation and would require longer path differences in the processor, but would in principle operate in the same way.

Alternative schemes for shifting the frequency of the optical pulses are available. One such arrangement (not shown) includes a mirror moveable in a direction perpendicular to its reflecting surface which, when it moved, would produce real Doppler shifts of the optical frequencies.

In another arrangement (not shown) instead of upshifting and downshifting the frequency of successive pulses, one would upshift (or downshift) every alternate pulse and transmit an unshifted pulse between each upshifted (or downshifted) pulse. The unshifted pulses are available if desired as a reference frequency. The effective frequency range would be halved, but in the other respects the operation of the transmission system would be substantially the same.

The foregoing discussion is intended to illustrate the principles of the invention. Numerous applications of these principles to various arrangements may occur to workers in the art without departure from the spirit and scope of the invention.

What is claimed is:

1. An optical information transmission system comprising:

an optical maser oscillator for producing an output comprising a train of optical pulses recurring at a fixed repetition rate and having a stable frequency spectrum;

means for variably shifting the frequency spectrum of selected ones of said pulses in response to an information-containing signal;

means for transmitting the pulses thereafter to a detection site;

means for beating selected pairs of the transmitted pulses thereby to produce at the detection site a varying beat frequency that is the analog of the information-containing signal; and means for extracting from the varying beat frequency the information contained in said signal.

2. The arrangement as claimed in claim 1 wherein the frequency spectrum of each odd pulse is shifted upward and the frequency spectrum of each even pulse is shifted downward, the magnitude of shift being dependent upon the amplitude of the information-containing signal.

3. The arrangement as claimed in claim 2 wherein the beating means comprises means for successively beating each two adjacent pulses.

4. The arrangement as claimed in claim 3 wherein the frequency shifting means comprises:

a member of electro-optic material;

means for directing said pulse train through said member;

means for applying to said member an electric field having a frequency equal to half the repetition rate of said pulses and having an amplitude varying in accordance with said information-containing signal; and means for adjusting the phase of said field with respect to the phase of said pulse train whereby each successive pulse traverses said member when its refractive index is undergoing the greatest time-rate of change.

5. The arrangement as claimed in claim 4 wherein the beating means comprises first and second divergent optical paths, a portion of the energy of each pulse traversing each said path, said paths finally converging, said second path being exactly enough longer than said first path to delay the pulse portions traveling therein by an amount equal to the time interval between pulses, the pulse portion in said first path thus overtaking the earlier pulse portion in said second path at the point of convergence thereby to produce a beat frequency, the latter containing said information.

6. The arrangement as claimed in claim 5 wherein said member is a crystal of lithium metaniobate.

7. The arrangement as claimed in claim 6 wherein said maser oscillator is mode-locked.

8. The arrangement as claimed in claim 7 wherein the electric field applied to said member is synchronized with the output of said mode-locked maser.

References Cited

UNITED STATES PATENTS

| | | | |
|---|---|---|---|
| 3,175,088 | 3/1965 | Herriott | 250—199 |
| 3,215,840 | 11/1965 | Buhrer | 250—199 |
| 3,262,058 | 7/1966 | Ballman. | |

OTHER REFERENCES

James R. McDermott: Space and Aeronautics, Transmitters and Receivers for Optical Communications, June 1963, p. 98.

ROBERT L. GRIFFIN, *Primary Examiner.*

ALBERT J. MAYER, *Assistant Examiner.*

U.S. Cl. X.R.

332—7.51